A. E. CHURCH.
CHUCK.
APPLICATION FILED DEC. 7, 1914.
1,181,843.
Patented May 2, 1916.
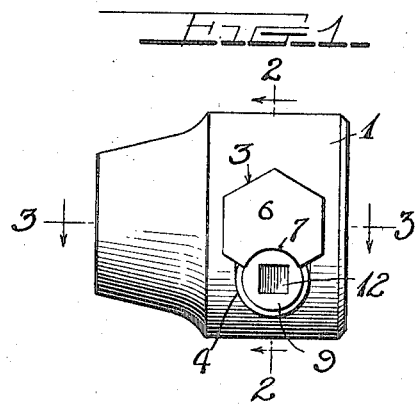
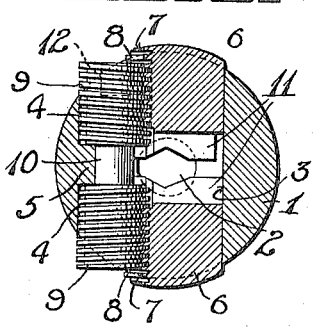
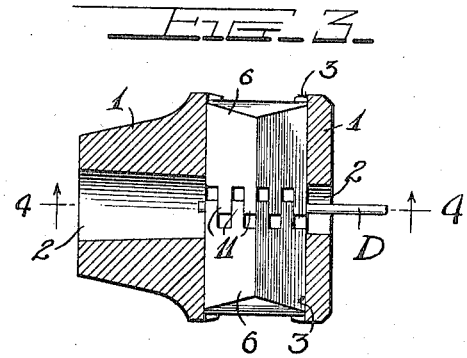
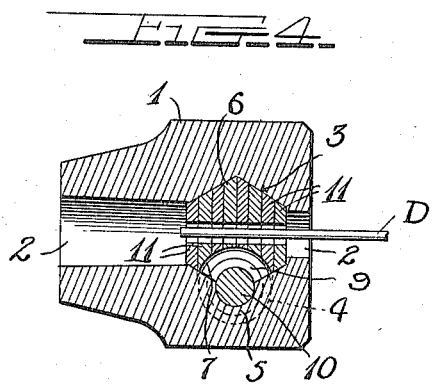
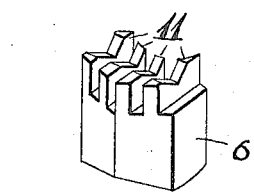
Witnesses
Inventor
A. E. Church.
By
Attorneys

UNITED STATES PATENT OFFICE.

ALBERT E. CHURCH, OF NEW BRITAIN, CONNECTICUT.

CHUCK.

1,181,843.  Specification of Letters Patent.  Patented May 2, 1916.

Application filed December 7, 1914. Serial No. 875,972.

*To all whom it may concern:*

Be it known that I, ALBERT E. CHURCH, a citizen of the United States, residing at New Britain, in the county of Hartford and State of Connecticut, have invented certain new and useful Improvements in Chucks; and I do declare the following to be a full, clear, and exact description of the invention, such as will enable others skilled in the art to which it appertains to make and use the same.

My invention relates to improvements in chucks, and more particularly to those adapted for use for holding drills.

The main object of the invention is to provide an extremely simple device which will be easy to operate and which will securely clamp the drill against movement.

In carrying out this object, a further object of the invention becomes to so construct a jaw feeding screw and parts closely associated therewith, as to allow larger drills to be inserted than would otherwise be possible.

With the above and other objects in view, the invention resides in certain novel features of construction and combination herein described and claimed and shown in the drawings wherein:

Figure 1 is a plan view of a chuck constructed in accordance with my invention; Fig. 2 is a vertical transverse section as seen on the line 2—2 of Fig. 1; Fig. 3 is a horizontal longitudinal section as seen on the line 3—3 thereof; Fig. 4 is a horizontal section taken along the plane of the line 4—4 of Fig. 3, and Fig. 5 is a perspective view of one of the jaws.

In these drawings, forming a part of this application, the improved chuck is shown as comprising a head or body 1 which is provided with an axial bore 2 and with a diametrical bore 3 which is of greater size than the bore 2 and intersects the same as shown. The bore 3 is here shown as having six flat walls. Formed in the angle between two of these walls and spaced laterally from the axis of the body 1, is a channel 4 which is of substantially semi-circular contour, the center of this channel being provided with an inwardly extending shoulder 5.

Mounted to slide in the opposite ends of the bore 3 is a pair of gripping jaws 6, each of which is provided with six flat faces which contact with the six flat faces of said bore, whereby these jaws are positively prevented from rotating, even to a slight degree, and are effectively guided in their movement. The outer sides of the jaws 6 are provided with grooves 7 which register with the channel 4 to provide two cylindrical recesses located one on each side of the shoulder 5, and the walls of these grooves are provided with rather coarsely pitched screw threads 8 for a purpose to appear.

Mounted to rotate in the channel 4 and located one on each side of the shoulder 5, is a pair of oppositely pitched screws 9 whose threads engage the threads 8. By reference to Fig. 2, it will be seen that the inner ends of these screws 9 do not project into the axial bore 2, but that they terminate at points spaced slightly therefrom. It will further be seen that said inner ends of the screws 9 are united by a cylindrical neck 10 which is formed integrally therewith, said neck contacting with the inner side of the shoulder 5, while the inner ends of the screws abut opposite sides thereof. This neck 10 is of such size as to prevent it from projecting into the bore 2.

By the construction just described, a drill as large as the bore 2 may be inserted into the chuck and gripped by the jaws without coming in contact with any part of the device but the latter. Were it not for the specific formation and location of the screws 9 and neck 10, however, these elements would obstruct the inward movement of the drill. Furthermore, by constructing the chuck as described and as shown in the drawings, no binding will take place between the screw and the threads 8, nor will the jaws 6 rock and bind in the diametrical bore 3, it being therefore seen that the specific details set forth in describing my invention produce advantages which are otherwise unobtainable.

In order to allow drills and the like of various diameters to be reliably centered and gripped between the two jaws 6, such jaws are provided on their inner adjacent ends with spaced parallel transversely extending flanges 11 having in their outer edges V-shaped notches. The notches in the flanges of each jaw are alined with each other, as well as with those of the other jaw, and the flanges on the one jaw are disposed in staggered relation with respect to those on the corresponding jaw, whereby the several flanges may be intermeshed as clearly disclosed in Fig. 3 to allow an exceptionally small drill to be gripped. It is to be observed that by this arrangement of parts, when gripping a drill or the like, no torsional strain will be exerted on the jaws and thus the latter may be easily adjusted. Furthermore, the drill, whether it be large or small, will be accurately centered.

As is common with devices of this character, one of the screws 9 is provided with a rectangular opening 12 in its outer end, whereby a key may be inserted for rotating said screws to open and close the jaws.

From the foregoing description, taken in connection with the accompanying drawings, it will be seen that a comparatively simple device has been provided for carrying out the objects of the invention, yet that the efficiency thereof will not be impaired by such simplicity.

I claim:

1. A chuck comprising a substantially cylindrical body having an axial bore and a diametrical bore of greater size than and intersecting the axial bore, said diametrical bore being hexagonal in end view and having, in one of its angles, a substantially semi-circular channel spaced laterally from the axis of the body, a shoulder formed integrally with and projecting from the body into the center of the channel, a pair of jaws hexagonal in end view slidably mounted in the opposite ends of the hexagonal bore and having substantially semi-circular longitudinally extending grooves formed in one of their angles and registering with the channel, said grooves having their walls threaded, a pair of oppositely threaded screws disposed in the two ends of the channel and engaging the threads on the jaws, and a reduced neck formed integrally with and uniting the inner ends of the screws, the latter being disposed in contact with the aforesaid shoulder.

2. A chuck comprising a body having an axial bore and a diametrical bore hexagonal in end view, said diametrical bore being of greater diameter than and intersecting said axial bore, a pair of jaws hexagonal in end view mounted to slide in the opposite ends of the hexagonal bore, and means to simultaneously slide said jaws in opposite directions.

In testimony whereof I have hereunto set my hand in presence of two subscribing witnesses.

ALBERT E. CHURCH.

Witnesses:
H. E. MYERS,
GEO. H. INGRAHAM.

Copies of this patent may be obtained for five cents each, by addressing the "Commissioner of Patents, Washington, D. C."